United States Patent
Ruhlander et al.

(10) Patent No.: US 7,353,728 B2
(45) Date of Patent: Apr. 8, 2008

(54) CONDUIT END FITTING

(75) Inventors: Gregory P. Ruhlander, Rochester Hills, MI (US); David A. Choby, Rochester, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 315 days.

(21) Appl. No.: 10/930,105

(22) Filed: Aug. 31, 2004

(65) Prior Publication Data

US 2006/0053942 A1    Mar. 16, 2006

(51) Int. Cl.
*F16C 1/10* (2006.01)

(52) U.S. Cl. .................. 74/502; 74/502.4; 74/502.6

(58) Field of Classification Search ........... 74/500.5, 74/501.5 R, 502, 502.4, 502.6, 501.6; 403/195, 403/122; F16C 1/10
See application file for complete search history.

(56) References Cited

U.S. PATENT DOCUMENTS

| | | | | |
|---|---|---|---|---|
| 4,339,213 A | | 7/1982 | Gilmore | 403/316 |
| 4,406,177 A | * | 9/1983 | Bennett et al. | 74/500.5 |
| 4,726,251 A | * | 2/1988 | Niskanen | 74/502 |
| 4,951,524 A | | 8/1990 | Niskanen | 74/502 |
| 5,347,882 A | | 9/1994 | Klotz | 74/502 |
| 5,383,377 A | | 1/1995 | Boike | 74/502 |
| 5,448,926 A | * | 9/1995 | Reasoner | 74/500.5 |
| 5,553,818 A | | 9/1996 | Wild et al. | |
| 5,884,531 A | | 3/1999 | Koenig | 74/502 |
| 5,937,705 A | * | 8/1999 | Corbett et al. | 74/501.5 R |
| 7,029,194 B2 | * | 4/2006 | Ishikawa et al. | 403/195 |
| 2003/0223805 A1 | * | 12/2003 | Ruhlander | 403/122 |
| 2004/0149480 A1 | | 8/2004 | Ball | |
| 2004/0255712 A1 | * | 12/2004 | Ruhlander | 74/502.4 |
| 2005/0186024 A1 | * | 8/2005 | Ruhlander | 403/122 |

FOREIGN PATENT DOCUMENTS

| | | |
|---|---|---|
| EP | 0678680 A | 10/1995 |
| EP | 1 469 209 A2 * | 10/2004 |
| FR | 2841614 A | 1/2004 |
| GB | 1216439 A | 12/1970 |
| JP | 2000039016 A | 9/2000 |

OTHER PUBLICATIONS

European Search Report EP 05255233 A.

* cited by examiner

*Primary Examiner*—Vinh T. Luong
(74) *Attorney, Agent, or Firm*—Peter D. McDermott; Banner & Witcoff, Ltd.; Dean B. Watson

(57) ABSTRACT

A conduit end fitting includes a length of conduit having a core wire extending therethrough and a fitting at an end of the length of conduit. An abutment is rotatably secured to the fitting and has an exterior groove configured to be seated on a substantially U-shaped bracket and a central aperture extending therethrough. A swivel guide tube has an aperture through which the core wire extends and extends through the central aperture of the abutment. A flexible joint member secures one end of the swivel guide tube to the abutment such that the swivel guide tube is rotationally fixed with respect to the abutment.

17 Claims, 4 Drawing Sheets

CONDUIT END FITTING

FIELD OF THE INVENTION

This invention relates generally to an end fitting for a length of conduit through which a core wire extends and, in particular to an end fitting having a flexible swivel joint for connecting a swivel guide tube to an abutment.

BACKGROUND OF THE INVENTION

Motion-transmitting remote control cable assemblies, sometimes referred to as "Bowden cables" or "push-pull cables", are used for transmitting both force and travel along a curved path in aircraft, automotive, and marine environments. Known cable assemblies can be used for transmitting load and motion in both push and pull type applications. In the automotive environment, typical applications include but are not limited to parking brakes, accelerators, hood releases, brake releases, trunk releases, park lock, tilt wheel controls, fuel filler doors, transmission shifter cables, and hydraulic control cables. One specific use of such remote control cable assemblies is positioning transmission shift members in automobiles.

A motion-transmitting remote control cable assembly for transmitting motion along a curved path typically includes a flexible core element (strand or core wire) slidably enclosed within a flexible outer sheath (conduit) with end fittings attached to both ends of each respective member. These fittings attach to and react load from the conduit to its mounting points and from the strand to its mounting points. The core wire is adapted at one end to be attached to a member to be controlled whereas the other end is attached to an actuator for longitudinally moving the core wire within the conduit. The conduit is adapted to be secured by the fittings to a support structure.

A conduit end fitting at an end of the length of conduit is typically secured to a bracket on the vehicle. The conduit end fitting provides for rotation of the core wire and conduit, allowing the conduit end fitting to be properly aligned with the bracket after the conduit and core wire have been placed in position in the vehicle, as well as providing for transmission of force through the mechanism.

U.S. Pat. No. 4,951,524 to Niskanen discloses a remote control assembly including a guide means that extends through a U-shaped seat in a support structure and supports a core element. An abutment means positions the guide means in the U-shaped seat. In Niskanen, the entire guide means rotates relative to the abutment means.

It is an object of the present invention to provide a conduit end fitting that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a conduit end fitting having improved performance and reliability. In accordance with a first preferred embodiment, a conduit end fitting includes a length of conduit having a core wire extending therethrough and a fitting at an end of the length of conduit. An abutment is rotatably secured to the fitting and has an exterior groove configured to be seated on a substantially U-shaped bracket and a central aperture extending therethrough. A swivel guide tube has an aperture through which the core wire extends and extends through the central aperture of the abutment. A flexible joint member secures one end of the swivel guide tube to the abutment such that the swivel guide tube is rotationally fixed with respect to the abutment.

In accordance with another preferred embodiment, a conduit end fitting includes a length of conduit having a core wire extending therethrough. A fitting is positioned at an end of the length of conduit. An abutment is rotatably secured to the fitting and has a central aperture and four grooves extending axially along an interior surface of the abutment and spaced approximately 90° from one another. A swivel guide tube has an aperture through which the core wire extends, and extends through the central aperture of the abutment. A swivel joint includes a ball at the end of the swivel guide tube and a groove formed in the ball and defining two pairs of diametrically opposed recesses. The pairs of recesses are offset approximately 90° from one another. A flexible annular member is positioned in the groove and has four interior projections extending radially inwardly and spaced approximately 90° from one another. Each interior projection is seated in a corresponding recess in the ball. Four exterior projections extend radially outwardly from the annular member and are spaced approximately 90° from one another. Each exterior projection is received in a groove in the abutment.

In accordance with yet another embodiment, a conduit end fitting includes a length of conduit having a core wire extending therethrough, with a fitting at an end of the length of conduit. An abutment is rotatably secured to the fitting and has an exterior groove configured to be seated on a substantially U-shaped bracket, a central aperture extending therethrough, and a plurality of axially extending grooves formed on an interior surface thereof. A swivel guide tube has an aperture through which the core wire extends, and extends through the central aperture of the abutment. A swivel joint connects an end of the swivel guide tube to the abutment and includes a ball on the end of the swivel guide tube. A groove is formed in an exterior surface of the ball and defines a plurality of recesses. A flexible joint member is seated in the groove and has a plurality of radially inwardly extending interior tabs. Each interior tab is seated in a recess. Each of a plurality of radially outwardly extending exterior tabs is received in an axially extending groove in the abutment.

In accordance with a further embodiment, a conduit end fitting includes a length of conduit having a core wire extending therethrough. A sleeve surrounds an end of the length of conduit. An isolator is positioned radially outwardly of the sleeve. A cap is positioned radially outwardly of the isolator. An abutment is secured to the cap and has a central aperture and a plurality of axially extending grooves on an interior surface thereof. A swivel guide tube extends through the central aperture of the abutment, with the core wire extending through the swivel guide tube. A swivel joint at one end of the swivel guide tube includes a ball at the end of the swivel guide tube. An annular groove that is formed in the ball defines two pairs of diametrically opposed recesses, with the pairs of recesses being offset approximately 90° from one another. A flexible annular member is positioned in the groove and has two pairs of diametrically opposed interior projections extending radially inwardly, with each interior projection seated in a corresponding recess. Two pairs of diametrically opposed exterior projections extend radially outwardly from the annular member, with each exterior projection seated in a corresponding axially extending groove of the abutment.

Substantial advantage is achieved by providing a conduit end fitting a flexible swivel joint for connecting a swivel guide tube to an abutment. In particular, the flexible swivel joint allows the swivel guide tube to pivot with respect to the abutment, while remaining rotationally fixed with respect to the abutment. These and additional features and advantages of the invention disclosed here will be further understood from the following detailed disclosure of certain preferred embodiments.

Figure 1:
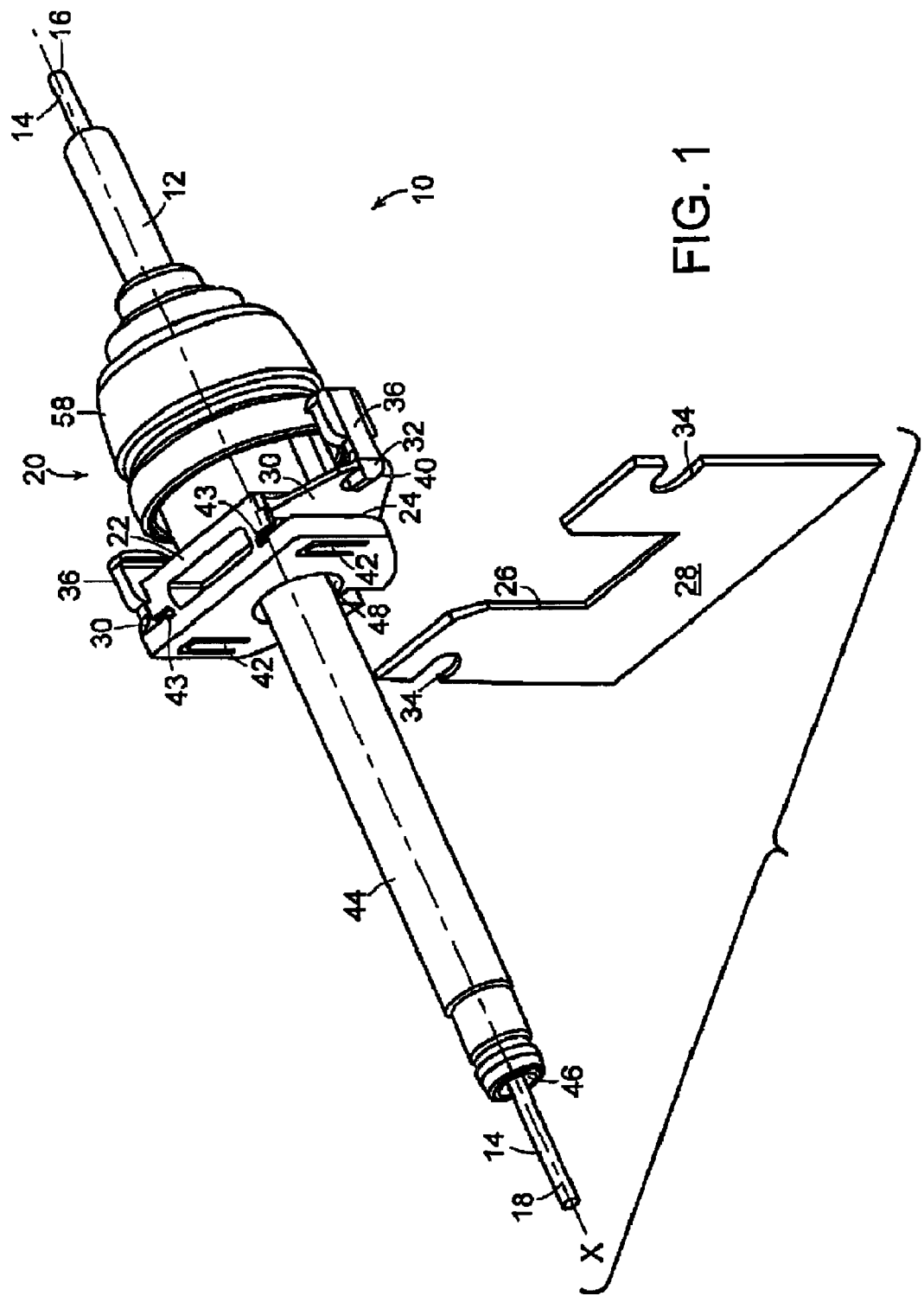
FIG. 1 is a perspective view of a conduit end fitting in accordance with a preferred embodiment of the present invention, shown prior to its attachment to a bracket.

The figures referred to above are not drawn necessarily to scale and should be understood to provide a representation of the invention, illustrative of the principles involved. Some features of the conduit end fitting depicted in the drawings have been enlarged or distorted relative to others to facilitate explanation and understanding. The same reference numbers are used in the drawings for similar or identical components and features shown in various alternative embodiments. Conduit end fittings as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of an end fitting 10 for a length of conduit 12 is shown in FIG. 1. A core wire 14 extends through conduit 12. A first or input end 16 of core wire 14 is connected to an actuating device (not shown) that is operated by a user in a motor vehicle while a second or output end 16 of core wire 14 is connected to the actuated device. For example, input end 16 may be connected to a shifter mechanism in the passenger compartment of the motor vehicle with output end 18 being connected to the transmission. It is to be appreciated that end fitting 10 may be used in conjunction with any push-pull mechanism employed in a motor vehicle including, for example, a trunk release, fuel filler door, hood release, and hydraulic control cables.

A fitting 20 receives an end of conduit 12 and is rotatably secured to an abutment 22. Abutment 22 has a groove 24 that allows abutment 22 to be seated in a recess 26 formed in a bracket 28 by receiving a portion of bracket 28. In the illustrated embodiment, recess 26 is substantially U-shaped. It is to be appreciated that recess 26 may have other shapes suitable for mating with abutment 22 and its corresponding groove 24. Bracket 28 is secured to a motor vehicle (not shown here) and acts as an anchoring member for end fitting 10. Each of a pair of wings 30 extends outwardly from opposed sides of abutment 22. A tab 32 is formed on each wing 30 and is received in a recess 34 formed in bracket 28, thereby helping secure abutment 22 to bracket 28. An axially extending arm 36 is formed at the end of each wing 30. To install abutment 22 onto bracket 28, a user grasps arms 36, thereby bending wings 30 back slightly. Abutment 22 is then slid onto bracket 28, with groove 24 receiving a portion of bracket 28 about recess 26. The user then releases arms 36, allowing tabs 32 to snap into recesses 34. To remove abutment 22, the user simply squeezes arms 36, pulling tabs 32 from recesses 34 and allowing the user to lift abutment 22 from bracket 28. In a preferred embodiment, tabs 32 have an angled lower surface 40, which allows tabs to more easily pass over bracket 28 as abutment 22 is slid onto bracket 28.

The components of end fitting 10 can have a relatively large tolerance range when used, for example, in automobile transmission shift systems. As a result of this large tolerance range, there can be a difference in fit between the abutment 22 and bracket 28, which produces a gap such that there can be relative movement between abutment 22 and bracket 28 (lash). This lash causes inaccuracy in the shift system throughout its full range. Lash tabs 42 may be formed in abutment 22, and exert an axial force against bracket 28, thereby providing a snug fit of abutment 22 to bracket 28, which helps to compensate for any manufacturing tolerances. In certain embodiments, vertically extending slits 43 are formed along an interior surface of groove 24 on opposed sides of abutment 22, providing additional flex in abutment 22 to compensate for manufacturing tolerances, i.e., lash.

Figure 2:
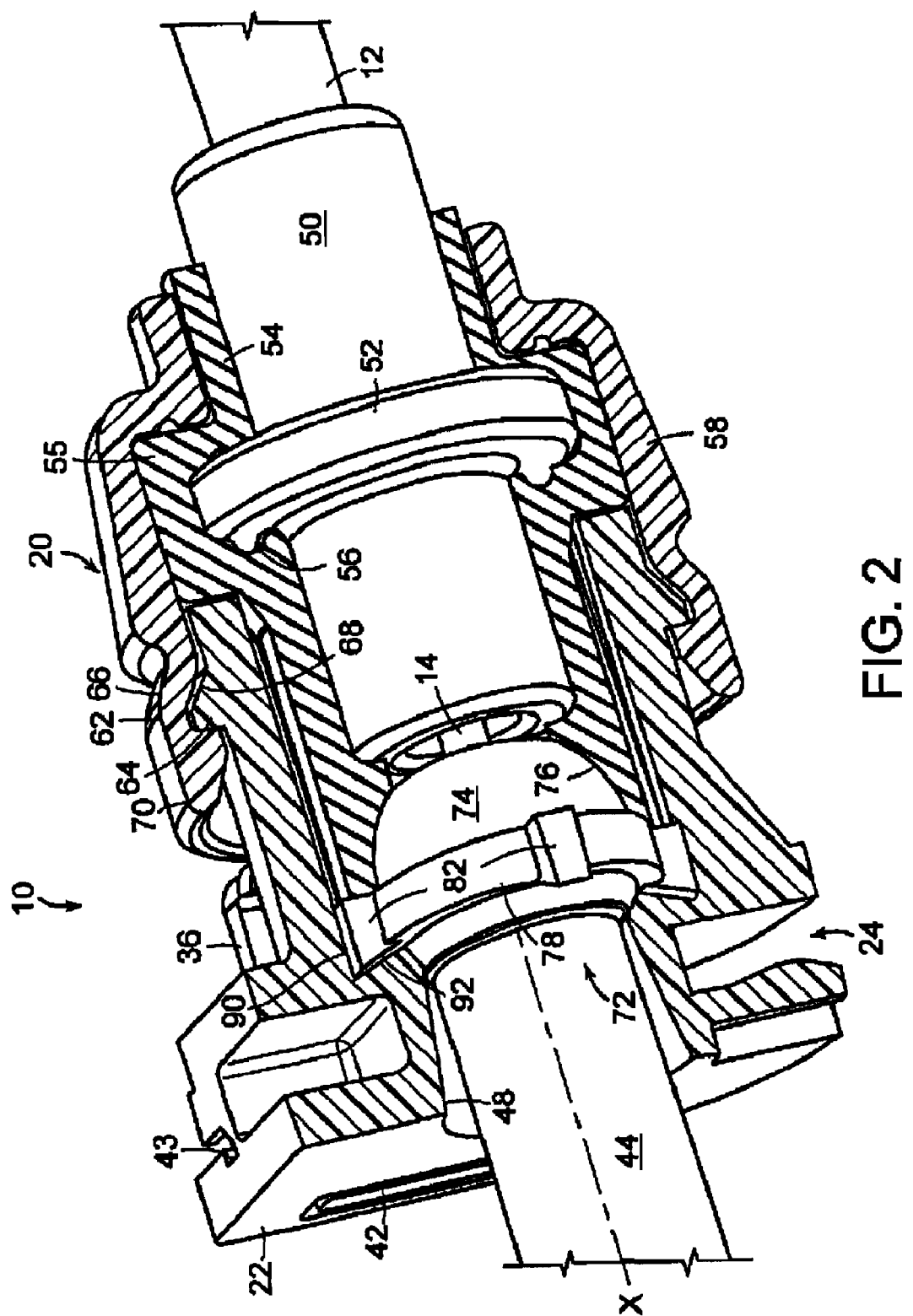
FIG. 2 is a section view of the conduit end fitting of FIG. 1, taken along line 2-2.

A swivel guide tube 44 has a longitudinal axis X and an aperture 46 through which core wire 14 extends. Abutment 22 has a central aperture 48 through which swivel guide tube 44 extends, as seen more clearly in FIG. 2. Central aperture 48 is flared toward an exterior of abutment 22, providing room for swivel guide tube 44 to pivot with respect to abutment 22.

Fitting 20 includes a sleeve 50, which receives the end of conduit 12. In a preferred. embodiment, sleeve 50 is formed of a plastic, such as nylon, and may be reinforced for increased strength, e.g., by being glass-filled. Sleeve is preferably molded about the end of conduit 12, thereby securely bonding it to conduit 12. A circumferential rib 52 is formed on sleeve 50. An isolator 54 is positioned about sleeve 50, and includes a circumferential flange 55. A circumferential recess 56 is formed on an interior surface of flange 55 and receives rib 52. Isolator 54 is preferably formed of an elastomer, or any resilient material, for example, a thermoplastic elastomer or rubber, or may be any type of resilient member that serves to provide vibration dampening for end fitting 10. A cap 58 covers isolator 54 and includes a shoulder 60 against which circumferential flange 55 of isolator 54 rests. A groove 62 is formed on an interior surface of cap 58 and receives a shoulder 64 formed on an exterior surface of abutment 22 in snap-fit fashion, thereby securing fitting 20 to abutment 22. The engagement of shoulder 64 with groove 62 allows fitting 20 and, therefore conduit 12 and core wire 14, to rotate with respect to abutment 22. In a preferred embodiment, a wall 66 of groove 62 that is remote from abutment 22 is sloped, a leading face 68 of shoulder is sloped to mate with wall 66, and an interior edge 70 of cap 58 at the end that receives abutment 22 is beveled. Thus, as cap 58 and abutment 22 are slid together, sloped face 68 slides inwardly against beveled edge 70 pushing cap 58 slightly outwardly and allowing shoulder 64 to slide in and enter groove 62. Once shoulder 64 is in groove 62, cap 58 snaps back into place, securing abutment 22 to cap 58 and the remainder of fitting 20.

Figure 3:
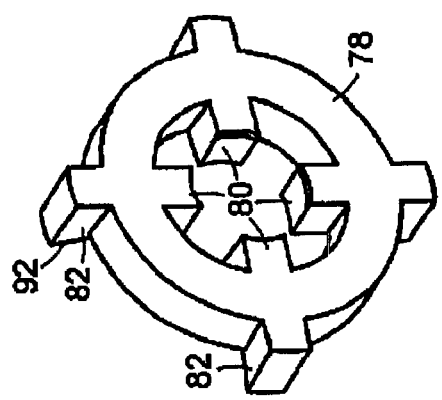
FIG. 3 is a perspective view of a flexible joint member of the conduit end fitting of FIG. 1.

A swivel joint 72 is provided at an end of swivel guide tube 44 and includes a ball 74, a portion of which is received in a recess 76 formed in isolator 58. In a preferred embodiment, swivel guide tube 44 and ball 74 are formed of a plastic, such as nylon, and may be reinforced for increased strength, e.g., by being glass-filled. A flexible joint member 78, seen more clearly in FIG. 3, encircles ball 74. Flexible joint member 78 is an annular member with a plurality of interior tabs 80 extending radially inwardly from its interior surface and a plurality of exterior tabs. In the illustrated embodiment, flexible joint member 78 has four interior tabs 80 spaced approximately 90° from one another and four exterior tabs 82 spaced approximately 90° from one another. It is to be appreciated that the number of interior tabs 80 and exterior tabs 82 may vary, and need not necessarily be the same. Additionally, the tabs need not necessarily be evenly spaced from one another. As illustrated here, interior tabs 80 and exterior tabs 82 are aligned with one another; however, it is to be appreciated that they need not be aligned and could be offset from one another.

In certain preferred embodiments, flexible joint member 78 is co-molded about ball 74 of swivel guide tube 44. In other preferred embodiments, flexible joint member 78 is formed as a separate element that is assembled with ball 74 of swivel guide tube 44.

Figure 4:
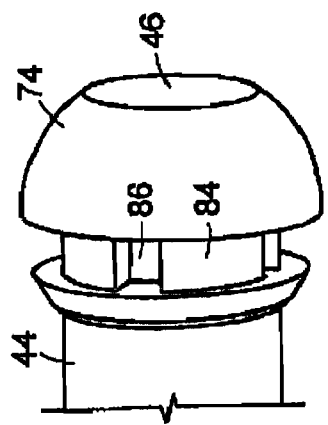
FIG. 4 is a perspective view of a portion of a swivel guide tube of the conduit end fitting of FIG.

As seen in FIG. 4, ball 74 includes a groove 84 within which a plurality of recesses 86 are formed. Groove 84 receives a portion of flexible joint member 78 and each interior tab 80 of flexible joint member 78 is received in a recess 86.

Figure 5:
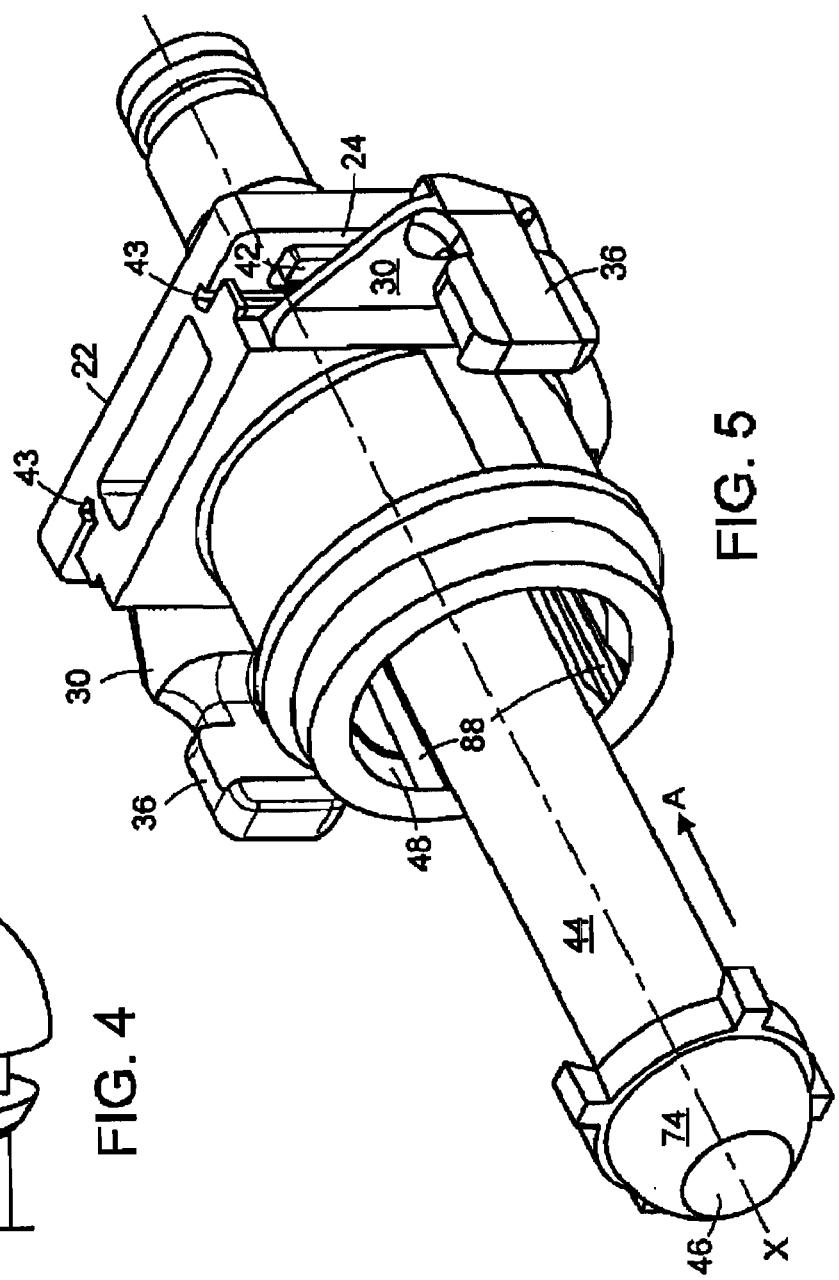
FIG. 5 is a perspective view of the conduit end fitting of FIG. 1, showing insertion of a swivel guide tube into an abutment.
Figure 6:
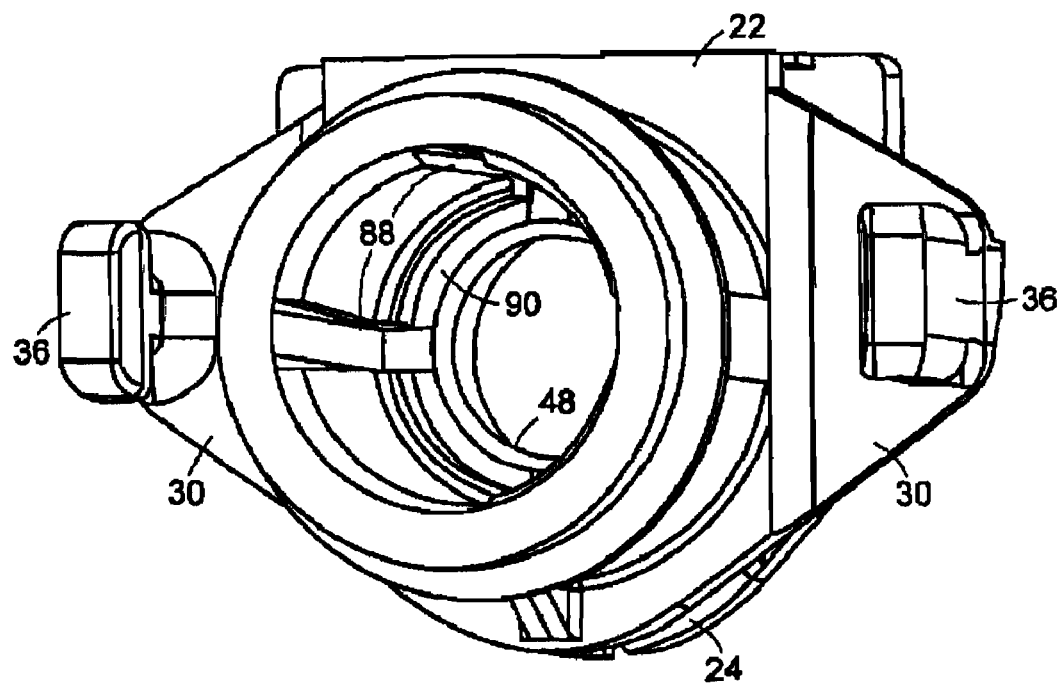
FIG. 6 is a perspective view of an abutment of the conduit end fitting of FIG. 1.

As seen in FIGS. 5-6, a plurality of axially extending grooves 88 is formed on an interior surface of abutment 22, with each exterior tab 82 sliding along a corresponding groove 88 as swivel guide tube 44 is inserted into abutment 22 in the direction of arrow A as seen in FIG. 5. At the interior ends of grooves 88, a recess 90 is formed, upon which flexible joint member 78 rests when it is inserted into abutment 22 with swivel guide tube 44.

Flexible joint member 78 is a resilient flexible member that allows swivel guide tube 44 to pivot with respect to abutment 22, providing flexibility for core wire 14. The engagement of exterior tabs 82 in grooves 88 of abutment 22 causes swivel guide tube 44 to be rotationally fixed about its longitudinal axis X with respect to abutment 22. In a preferred embodiment, the axial faces 92 of exterior tabs 82 that engage recess 90 of abutment 22 are angled outwardly, which increases the depth of exterior tabs 82 to provide additional surface area for interference with grooves 88.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A conduit end fitting comprising, in combination:
    a length of conduit having a core wire;
    a fitting on the length of conduit, the fitting comprising:
        a molded sleeve secured about an exterior of the end of the length of conduit;
        an isolator positioned about the molded sleeve; and
        a cap positioned about the isolator;
    an abutment rotatably secured to the fitting and having an exterior groove configured to be seated in a recess, the abutment including a peripheral shoulder received in snap-fit manner in a groove formed on an interior surface of the cap; and
    a swivel guide tube having a guide tube aperture through which the core wire extends, the core wire extending through a central aperture of the abutment, and having a flexible joint member at one end thereof securing the swivel guide tube to the abutment such that the swivel guide tube is rotationally fixed about its longitudinal axis with respect to the abutment to prevent full rotation of the swivel guide tube with respect to the abutment.

2. The conduit end fitting of claim 1, wherein the flexible joint member is formed of an elastomeric material.

3. The conduit end fitting of claim 1, wherein the isolator is formed of a resilient material.

4. The conduit end fitting of claim 1, wherein the abutment includes a pair of opposed wings, each wing having a tab configured to be received in a recess formed on the bracket, and an arm extending axially from an end of the wing.

5. The conduit end fitting of claim 1, wherein the swivel guide tube pivots with respect to the abutment.

6. The conduit end fitting of claim 5, wherein the central aperture flares outwardly to allow the swivel guide tube to pivot with respect to the abutment.

7. A conduit end fitting comprising, in combination:
    a length of conduit having a core wire;
    a fitting on the length of conduit;
    an abutment rotatably secured to the fitting and having an exterior groove configured to be seated in a recess; and
    a swivel guide tube having a guide tube aperture through which the core wire extends, the core wire extending through an aperture of the abutment, and having a flexible joint member at one end thereof securing the swivel guide tube to the abutment such that the swivel guide tube is rotationally fixed about its longitudinal axis with respect to the abutment to prevent full rotation of the swivel guide tube with respect to the abutment, the swivel guide tube including a ball at one end, a portion of which is received by the abutment and the fitting;
    wherein the ball includes a groove formed about its periphery and defining a plurality of recesses, and the flexible joint member is an annular member having a plurality of interior tabs extending radially inwardly from its interior surface, each interior tab received in a recess in the groove.

8. The conduit end fitting of claim 7, wherein the abutment includes a plurality of axially extending grooves and the flexible joint member includes a plurality of exterior tabs extending radially outwardly from its exterior surface, each exterior tab received in a groove of the abutment.

9. The conduit end fitting of claim 8, wherein the flexible joint member includes four exterior tabs spaced approximately 90° from one another and four interior tabs spaced approximately 90° from one another.

10. A conduit end fitting comprising, in combination:
    a length of conduit having a core wire extending therethrough;
    a fitting at an end of the length of conduit;
    an abutment rotatably secured to the fitting and having a central aperture and four grooves extending axially along an interior surface of the abutment and spaced approximately 90° from one another;

a swivel guide tube having an aperture through which the core wire extends and extending through the central aperture of the abutment; and
a swivel joint comprising:
a ball at the end of the swivel guide tube;
a groove formed in the ball and defining two pairs of diametrically opposed recesses, the pairs of recesses offset approximately 90° from one another; and
a flexible annular member positioned in the groove and having four interior projections extending radially inwardly and spaced approximately 90° from one another, each interior projection seated in a corresponding recess in the ball, and four exterior projections extending radially outwardly and spaced approximately 90° from one another, each exterior projection received in a groove in the abutment.

11. The conduit end fitting of claim 10, wherein the fitting comprises:
a molded sleeve secured about an exterior of the end of the length of conduit;
an isolator positioned about the molded sleeve; and
a cap positioned about the isolator.

12. The conduit end fitting of claim 10, wherein the abutment includes a pair of opposed wings, each wing having a tab configured to be received in a recess formed on the bracket, and an arm extending axially from an end of the wing.

13. A conduit end fitting comprising, in combination:
a length of conduit having a core wire extending therethrough;
a fitting at an end of the length of conduit;
an abutment rotatably secured to the fitting and having an exterior groove configured to be seated on a substantially U-shaped bracket, a central aperture extending therethrough, and a plurality of axially extending grooves formed on an interior surface thereof;
a swivel guide tube having an aperture through which the core wire extends, and extending through the central aperture of the abutment; and
a swivel joint connecting an end of the swivel guide tube to the abutment and comprising:
a ball on the end of the swivel guide tube, a groove formed in an exterior surface of the ball and defining a plurality of recesses; and
a flexible joint member seated in the groove and having a plurality of radially inwardly extending interior tabs, each interior tab seated in a recess, and a plurality of radially outwardly extending exterior tabs, each exterior tab received in an axially extending groove in the abutment.

14. The conduit end fitting of claim 13, wherein the fitting comprises:
a molded sleeve secured about an exterior of the end of the length of conduit;
an isolator positioned about the molded sleeve; and
a cap positioned about the isolator.

15. The conduit end fitting of claim 13, wherein the abutment includes a pair of opposed wings, each wing having a tab configured to be received in a recess formed on the bracket, and an arm extending axially from an end of the wing.

16. A conduit end fitting comprising, in combination:
a length of conduit having a core wire extending therethrough;
a sleeve surrounding an end of the length of conduit;
an isolator positioned radially outwardly of the sleeve;
a cap positioned radially outwardly of the isolator;
an abutment secured to the cap and having a central aperture and a plurality of axially extending grooves on an interior surface thereof;
a swivel guide tube extending though the central aperture of the abutment, the core wire extending though the swivel guide tube; and
a swivel joint at one end of the swivel guide tube, the swivel joint comprising:
a ball at the end of the swivel guide tube;
an annular groove formed in the ball and defining two pairs of diametrically opposed recesses, the pairs of recesses offset approximately 90° from one another; and
a flexible annular member positioned in the groove and having two pairs of diametrically opposed interior projections extending radially inwardly, each interior projection seated in a corresponding recess, and two pairs of diametrically opposed exterior projections extending radially outwardly, each exterior projection seated in a corresponding axially extending groove of the abutment.

17. The conduit end fitting of claim 16, wherein the abutment includes a pair of opposed wings, each wing having a tab configured to be received in a recess formed on the bracket, and an arm extending axially from an end of the wing.

* * * * *